US009379884B2

United States Patent
Ciacci et al.

(10) Patent No.: US 9,379,884 B2
(45) Date of Patent: Jun. 28, 2016

(54) SYMBOL CLOCK RECOVERY CIRCUIT

(71) Applicant: NXP B.V., Eindhoven (NL)

(72) Inventors: Massimo Ciacci, Den Bosch (NL);
Ghiath Al-kadi, Eindhoven (NL);
Remco van de Beek, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/702,645

(22) Filed: May 1, 2015

(65) Prior Publication Data

US 2015/0318979 A1    Nov. 5, 2015

(30) Foreign Application Priority Data

May 2, 2014    (EP) .................... 14166924

(51) Int. Cl.
*H04L 7/00*    (2006.01)
*H04L 7/027*    (2006.01)
*H04L 7/033*    (2006.01)

(52) U.S. Cl.
CPC ............ *H04L 7/0276* (2013.01); *H04L 7/0012* (2013.01); *H04L 7/0332* (2013.01); *H04L 7/0334* (2013.01)

(58) Field of Classification Search
CPC ... H04L 7/0276; H04L 7/0332; H04L 7/0012; H04L 1/0026; H04L 1/0003; H04L 7/0334; H04J 3/0682; H04J 3/0638
See application file for complete search history.

(56) References Cited

U.S. PATENT DOCUMENTS

| 4,712,243 | A | * | 12/1987 | Ninomiya | ............... | G10L 15/12 704/250 |
| 5,920,220 | A | | 7/1999 | Takao et al. | | |
| 6,127,897 | A | | 10/2000 | Sasaki | | |
| 6,377,634 | B1 | | 4/2002 | Yamamoto | | |
| 2005/0141660 | A1 | | 6/2005 | Kim | | |
| 2005/0254611 | A1 | * | 11/2005 | Liu | ....................... | H04L 7/0004 375/355 |
| 2006/0078071 | A1 | * | 4/2006 | Lee | ......................... | H04L 7/027 375/326 |
| 2012/0068866 | A1 | * | 3/2012 | Robinson | ............ | H03M 1/0836 341/118 |
| 2012/0131405 | A1 | * | 5/2012 | Licona | ............ | G11B 20/10481 714/746 |
| 2012/0269304 | A1 | * | 10/2012 | Ciacci | .................. | H04L 7/0334 375/342 |

* cited by examiner

*Primary Examiner* — Syed Haider

(57) ABSTRACT

A symbol clock recovery circuit comprising an ADC, a controllable inverter and a timing detector. A timing detector input terminal is configured to receive an ADC output signal from an ADC output terminal; a timing detector output terminal is configured to provide a digital output signal; and a first timing detector feedback terminal is configured to provide a first feedback signal to the inverter control terminal. The timing detector is configured to determine an error signal associated with the received ADC output signal, and set the first feedback signal in accordance with the error signal.

20 Claims, 3 Drawing Sheets

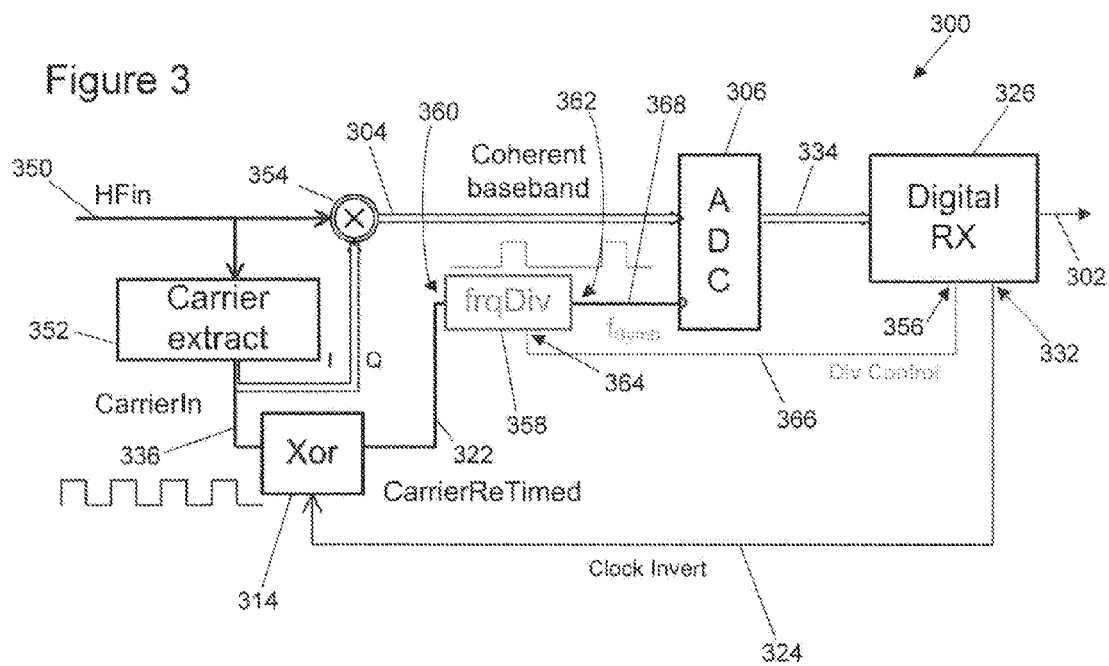
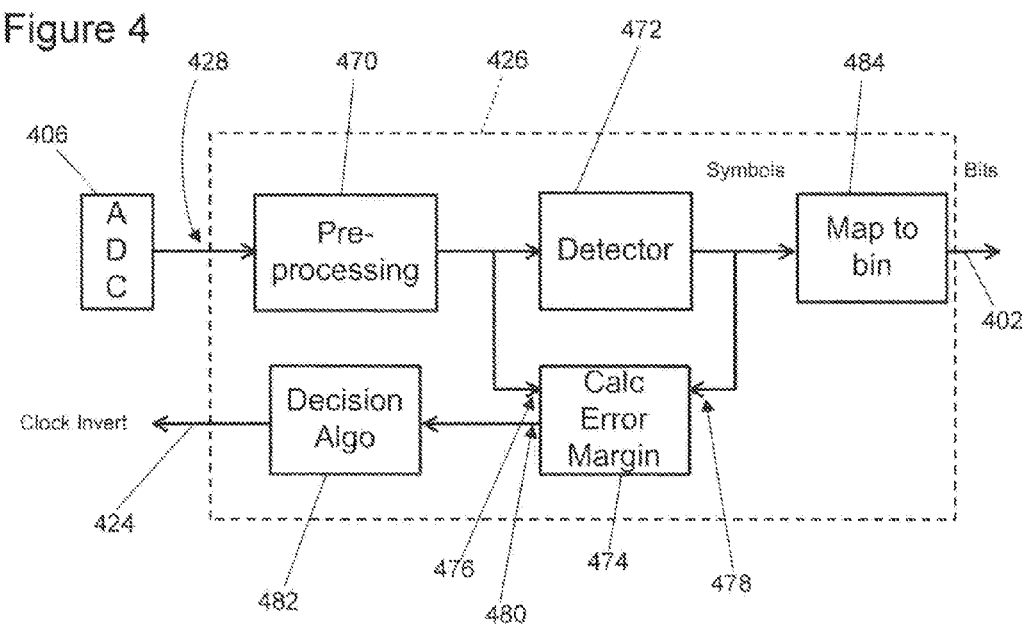

SYMBOL CLOCK RECOVERY CIRCUIT

CROSS-REFERENCE TO RELATED APPLICATIONS

This application claims the priority under 35 U.S.C. §119 of European patent application no. 14166924.2, filed on May 2, 2014, the contents of which are incorporated by reference herein.

The present disclosure relates to the field of symbol clock recovery circuits.

According to a first aspect of the invention, there is provided a symbol clock recovery circuit comprising:

an ADC comprising an ADC input terminal, an ADC output terminal and an ADC clock terminal, wherein the ADC input terminal is configured to receive a baseband signal, wherein the baseband signal is representative of one or more symbols, and wherein the ADC output terminal is configured to provide an ADC output signal;

a controllable inverter comprising an inverter input terminal, an inverter output terminal and an inverter control terminal, wherein the inverter input terminal is configured to receive a carrier frequency signal, the inverter output terminal is configured to provide a configurable clock signal to the ADC clock terminal; and wherein the configurable clock signal is selectively inverted with respect to the received carrier frequency signal in accordance with a first feedback signal received at the inverter control signal;

a timing detector comprising a timing detector input terminal, a timing detector output terminal, a first timing detector feedback terminal, wherein:

the timing detector input terminal is configured to receive the ADC output signal from the ADC output terminal;

the timing detector output terminal is configured to provide a digital output signal; and the first timing detector feedback terminal is configured to provide the first feedback signal to the inverter control terminal;

wherein the timing detector is configured to determine an error signal associated with the received ADC output signal, and set the first feedback signal in accordance with the error signal.

The timing detector may be configured to compare a representation of the error signal with a threshold, and set the first feedback signal in accordance with a result of the comparison of the representation of the error signal with the threshold.

The controllable inverter may be configured to set a timing of a rising edge, or a falling edge, of the configurable clock signal at a resolution of half carrier frequency.

The ADC may be configured to perform an analogue to digital conversion upon receipt of either a rising edge or a falling edge in the configurable clock signal received at the ADC clock signal.

The timing detector may be configured to determine the error signal associated with the received ADC output signal by comparing (i) a signal representative of the ADC output signal with (ii) a signal representative of the digital output signal.

The timing detector may be configured to:

compare a first representation of the error signal with a first threshold, compare a second representation of the error signal with a second threshold, and set the first feedback signal in accordance with a result of either or both of (i) the comparison of the first represen-tation of the error signal with the first threshold, and (ii) the comparison of the second representation of the error signal with the second threshold.

The timing detector may be configured to:

compare a consolidated value of the first representation of the error signal and the second representation of the error with a threshold, which is a predefined fraction of a symbol interval; and set the first feedback signal in accordance with a result of the comparison of the consolidated value with the threshold.

The first representation of the error signal may comprise a maximum value of the error signal. The second representation of the error signal may comprise a minimum value of the error signal.

The first threshold may be the same as, or different to, the second threshold.

The timing detector may be configured to set the first feedback signal in accordance with (i) a result of the comparison of the representation of the error signal with the threshold, and (ii) a result of a comparison of a representation of an earlier error signal with a threshold.

The inverter output terminal may be connected indirectly to the ADC clock terminal via a timing selector, the timing selector comprising a timing selector input terminal, a timing selector output terminal and a timing selector control terminal. The timing selector input terminal may be configured to receive the configurable clock signal from the controllable inverter. The timing selector output terminal may be configured to provide an adjusted configurable clock signal to the ADC clock terminal. The timing selector control terminal may be configured to receive a second feedback signal. The timing selector may be configured to provide the adjusted configurable clock signal such that it has a transition that corresponds to one of a plurality of transitions in the carrier frequency signal during a single symbol in the received baseband signal. The selected one of the plurality of transitions may be selected in accordance with the second feedback signal. The timing detector may have a second feedback terminal that is configured to provide the second feedback signal. The timing detector may be configured to sequentially set the second feedback signal at a plurality of control values, and subsequently set the second feedback signal in accordance with received ADC output signals for the plurality of control values.

The timing detector may be configured to:

determine, for each of the plurality of control values, a conversion metric representative of the quality of the conversion;

in accordance with the determined conversion metrics, subsequently set the second control signal as one of the plurality of control values.

The timing detector may be configured to perform an integer frequency division operation on the received configurable clock signal, such that the frequency of the adjusted configurable clock signal matches the frequency of symbols in the coherent baseband signal.

There may be provided a data communication system comprising any symbol clock recovery circuit disclosed herein.

There may be provided an integrated circuit comprising any symbol clock recovery circuit disclosed herein, or any data communication system disclosed herein.

There may be provided a computer program, which when run on a computer, causes the computer to configure any apparatus, including a circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be provided as firmware, or may be embodied as a transient signal. Such a transient signal may be a network download, including an internet download.

A description is now given, by way of example only, with reference to the accompanying drawings, in which:

FIG. 3 shows a signal processing circuit;

FIG. 4 shows an example implementation of a digital receiver;

Figure 6:
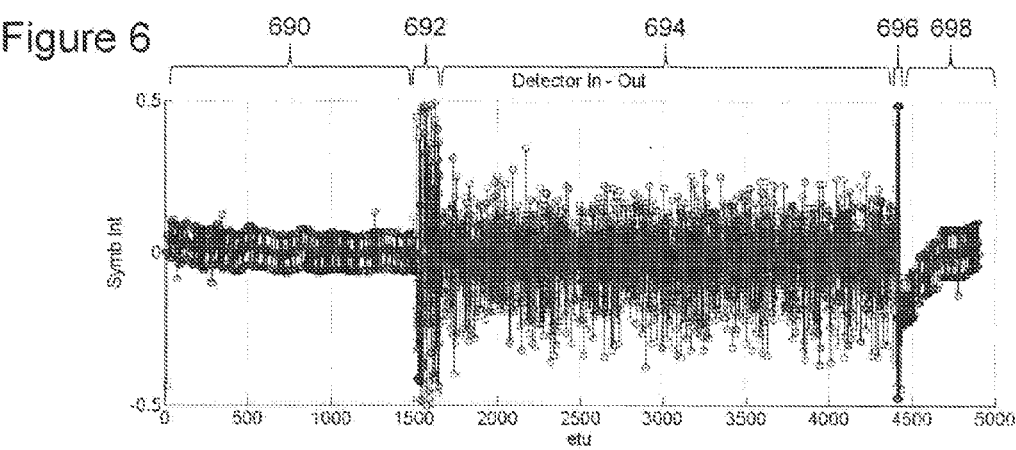
Figure 7:
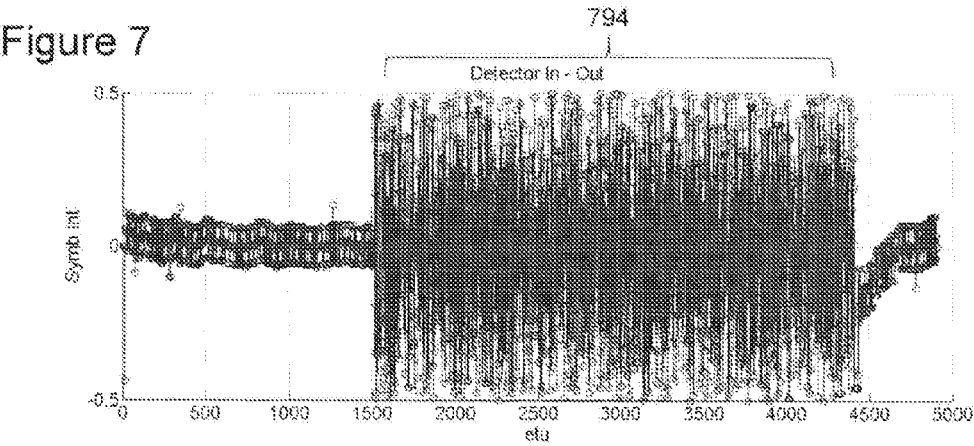

FIG. 6 shows an example error signal that can be achieved for a receiver that utilises a first feedback signal; and FIG. 7 shows an example error signal for a receiver that does not utilise a first feedback signal Examples disclosed in this document relate to a symbol clock recovery circuit that can selectively invert a received carrier signal in order to produce a configurable clock signal for an ADC. In this way a falling edge in the received carrier signal can occur as a rising edge in the configurable clock signal, thereby enabling an ADC to be used that is triggered by one type of signal transition (either rising edge or falling edge) yet can be triggered at a time that corresponds to either a rising edge or falling edge in the original carrier signal. This therefore enables half carrier accuracy timing and can improve performance of the symbol clock recovery circuit. As will be described below, such performance improvement can be particularly well suited to high data rate communications systems that use radio-frequency identification (RFID).

Figure 1:
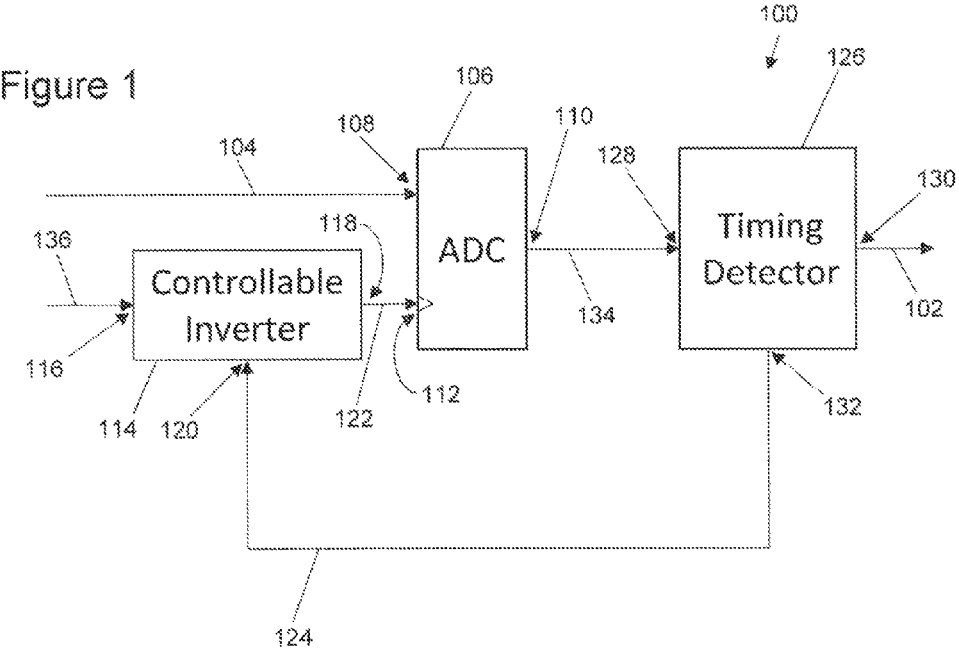
FIG. 1 shows a symbol clock recovery circuit.

FIG. 1 shows a symbol clock recovery circuit 100 that can accurately recover a symbol clock signal such that an accurate digital output signal 102 can be determined from a received baseband signal 104. The baseband signal 104 is representative of one or more symbols. In particular, an accurate digital output signal 102 can be obtained even when the symbol duration is a small integer multiple of a carrier signal period, for example a symbol duration that is only twice the carrier signal period.

The symbol clock recovery circuit 100 includes an analogue-to-digital converter (ADC) 106 that has an ADC input terminal 108, an ADC output terminal 110 and an ADC clock terminal 112. As is known in the art, the ADC 106 converts an analogue signal received at its ADC input terminal 108 into an output digital signal, which it provides at its ADC output terminal 110. The timing of the conversion is set by a clock signal received at the ADC clock terminal 112, more particularly, upon receipt of either a rising edge or a falling edge in the clock signal. In this example, a conversion operation is performed by the ADC 106 upon receipt of a rising edge of the clock signal.

The ADC input terminal 108 receives the baseband signal 104 that is representative of one or more symbols. The one or more symbols can be considered as modulation symbols that have been modulated onto a carrier signal for transmission as a high frequency (HF) signal, as is well known in the art. The samples of the demodulated carrier have a timing that is coherent with the transmitted HF signal. The frequency of the samples can be less than or equal to the frequency of the carrier. The ADC output terminal 110 provides an ADC output signal 134.

The symbol clock recovery circuit 100 includes a controllable inverter 114 that has an inverter input terminal 116, an inverter output terminal 118 and an inverter control terminal 120. The inverter input terminal 116 is configured to receive a carrier frequency signal 136, which as described below can be obtained from a received HF signal. The inverter output terminal 118 provides a configurable clock signal 122 to the ADC clock terminal 112. In this example, the configurable clock signal 122 is provided directly to the ADC clock terminal 112, although it will be appreciated from the description that follows that in other examples the configurable clock signal 122 can be provided indirectly to the ADC clock terminal 112; that is, via another processing block/component such as a programmable frequency divider. The configurable clock signal 122 is selectively inverted with respect to the received carrier frequency signal 136 in accordance with a first feedback signal 124 received at the inverter control signal 120. That is, the configurable clock signal 122 is either an inverted version of the received carrier frequency signal 136, or is the same as the received carrier frequency signal 136 (that is, it is not inverted) depending upon the first feedback signal 124. In this way, the ADC 106 can be clocked at a moment in time that corresponds to a rising edge of the carrier frequency signal 136 (when the controllable clock signal 122 is the same as the carrier frequency signal 136), or can be clocked at a moment in time that corresponds to a falling edge of the carrier frequency signal 136 (when the controllable clock signal 122 is inverted with respect to the carrier frequency signal 136, in which case a falling edge in the carrier frequency signal 136 represents a rising edge in the controllable clock signal 122).

The symbol clock recovery circuit 100 also includes a timing detector 126 that has a timing detector input terminal 128, a timing detector output terminal 130, and a first timing detector feedback terminal 132. The timing detector input terminal 128 is configured to receive the ADC output signal 134 from the ADC output terminal 110. The timing detector output terminal 130 is configured to provide the digital output signal 102. The timing detector 126 may also be referred to as a digital receiver, and may process the received ADC output signal 134, which can include noise for example, in order to provide a less noisy digital output signal 102.

The first timing detector feedback terminal 132 of the timing detector 126 provides the first feedback signal 124 to the inverter control terminal 120. As indicated above, the first feedback signal 124 will be used to set whether or not the controllable inverter 114 inverts the carrier frequency signal 136 when generating the configurable clock signal 122. The first feedback signal 124 is indicative of whether the inverted or un-inverted carrier frequency signal 136 is expected to provide a more accurate digital output signal 102. The timing detector 126 can determine an error signal associated with the received ADC output signal 134, and then set the first feedback signal 124 in accordance with the error signal. In some examples, this processing can involve minimizing or reducing an error metric (for example, the energy of some error signal) obtained for different values of the first feedback signal 124. In other examples, as discussed below, the timing detector 126 can compare a representation of the error signal with a threshold, and then set the first feedback signal 124 in accordance with a result of the comparison of the representation of the error signal with the threshold. This second approach can enable the symbol clock recovery circuit 100 to maintain a current value for the first feedback signal 124 without having to check the level of performance for a different value of the first feedback signal 124.

Figure 2:
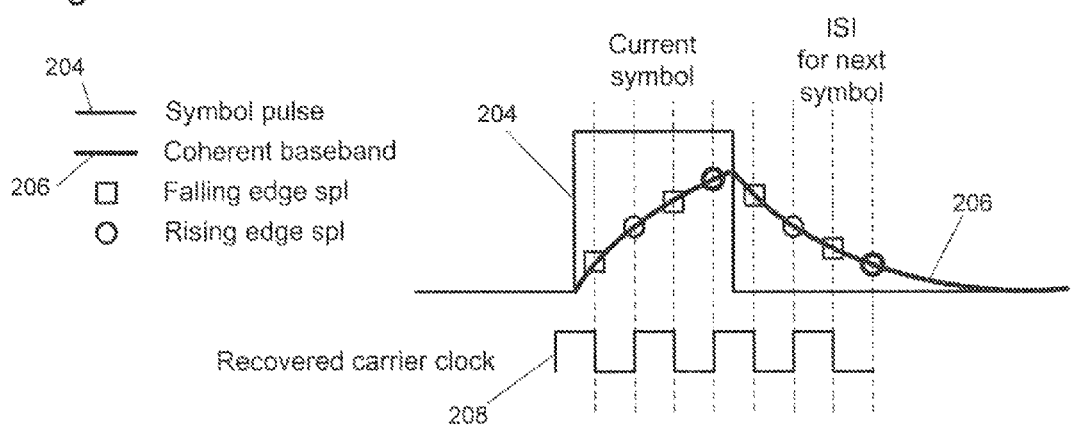
FIG. 2 shows example values of various signals in the circuit of FIG. 1.

FIG. 2 shows example values of the following signals:
a coherent baseband signal 206, such as the signal received at the ADC input terminal of FIG. 1. As indicated in FIG. 2, the coherent baseband signal 206 is subject to inter-symbol interference (ISI) from adjacent symbols;
a recovered carrier clock signal 208, such as the signal received at the controllable inverter input terminal of FIG. 1; and
a symbol pulse signal 204, which shows the symbol information represented by the coherent baseband signal 206, and represents the intended digital output signal provided at the timing detector output terminal of FIG. 1.

FIG. 2 shows that in this example, the duration of a symbol 204 is modulated onto only two periods of the recovered carrier clock signal 208. This can be considered as a very high data rate communication system. As indicated above, example circuits disclosed in this document are particularly advantageous for such systems, and particularly where a symbol time is as short as 2 carrier periods.

FIG. 2 shows a sequence of squares and circles on the coherent baseband signal 206, which represent sampled analogue values at corresponding rising and falling edges of the recovered carrier clock signal 208, that will be used to convert the coherent baseband signal 206 into a digital signal. This sampling can be performed by the ADC of FIG. 1.

It can be seen from FIG. 2 that the samples obtained with rising edges versus the samples obtained at falling edges of the recovered carrier clock signal 208 differ by a length of time that corresponds to half a period of the recovered carrier clock signal 208. It can also be seen that the values of the samples obtained for rising edges (indicated with a circle in FIG. 2) are very different to the values of the samples obtained for falling edges (indicated with a square in FIG. 2), and therefore can potentially produce a different signal level when converted to a digital signal.

In FIG. 2, the symbol pulse 204 is a non-return to zero (NRZ) pulse. It can be seen that the best sampling timing (the one with most signal energy) is as close as possible to the end of the pulse 204. This is because it simultaneously maximizes the energy for the current symbol 204 and minimizes the energy of the ISI from the previous symbol, thereby maximizing the signal to interference and noise ratio (SINR). The time grid on which the symbol pulse is aligned is determined by the transmitter and in general is designed such that the transition at the end of a symbol 204 is not guaranteed to coincide with a rising or falling edge of the recovered carrier clock signal 208. For a high data rate communication it is common that the pulse duration is only a few carrier periods, for example the two as depicted in FIG. 2. That is, the symbol rate can approach the carrier rate. In such cases, and as can be seen in FIG. 2, half a carrier symbol timing error can make a great difference, and completely impair the performance. Symbol timing synchronization can therefore be particularly important for receiver performance, (for example in terms of bit error rate (BER)) of an associated digital receiver.

In a coherent demodulator, the carrier signal is extracted from the received signal containing the information to be demodulated. The problem of finding the preferred symbol timing can then by reduced to the sub-problem of finding a sufficiently good sample phase/sampling instant within a known timing grid defined by the zero crossings of the recovered carrier.

In practical implementations of a coherent receiver path, it may not be possible to choose the ADC sample instants with arbitrary accuracy. For example they may coincide with either the rising or falling edges (zero crossings) of the recovered carrier, so that the accuracy with which the receiver will choose the symbol timing is limited to one carrier time. Again, this can be a significant problem for very high data rate communication systems, where a symbol time can be as short as 2 carrier periods.

For RFID systems, these problems can be made worse by an inherent unknown of the sign of the received RF waveform in a communication reader to card. The voltage and current induced by the magnetic field changes its sign if the transponder device (the smart card) is flipped. This means that the ADC sampling grid, which is constructed upon the RF waveform itself, will also depend on the orientation of the smart card with respect to the reader. More precisely, by flipping the card the sampling time will be changed by half a carrier period. For high data rate communication, such as RFID at 13.56 MHz carrier, with data rate of 6.78 Mbps, which runs at a symbol rate of fc/2, if a first feedback signal is not used then only one side of the smart card may be able to correctly receive a frame. In contrast, if a first feedback signal is used, then both sides of the smart card may be usable.

FIG. 3 shows a signal processing circuit, which includes a symbol clock recovery circuit 300 for a data communication system using coherent demodulation, which has similarities to the symbol clock recovery circuit of FIG. 1. The signal processing circuit may be referred to as a coherent demodulator. The digital receiver 326 of FIG. 3 performs the same functionality as the timing detector of FIG. 1, and can reconstruct transmitted symbols from a received baseband signal. The exclusive-or (XOR) gate 314 of FIG. 3 performs the same functionality as the controllable inverter of FIG. 1; the Xor gate represents a simple and convenient implementation of a component that can perform conditional inversion. The ADC 306 of FIG. 3 performs the same functionality as the ADC of FIG. 1. These components will therefore not necessarily be described again here.

The signal processing circuit of FIG. 3 receives a high frequency input (HFin) signal 350. In one example, the signal processing circuit may be a radio-frequency identification (RFID) card/tag reader, and the HFin signal 350 is a signal received from an antenna in communication with an RFID card/tag. The HFin signal 350 comprises modulation symbols that have been impressed onto a carrier. The modulation scheme can be chosen in such a way that the carrier signal is not suppressed at the receiving device. For example, this can be achieved when the average of the constellation points does not coincide with the origin of the IQ plane. As a result, the carrier signal is available in the received signal for a carrier recovery circuit (for example a carrier extraction block 352) to lock on to. This may avoid the need for a crystal, and can enable true coherent demodulation to take place. The modulation symbols can be in a fixed phase and frequency relationship with the transmitted carrier signal, and the symbol duration can be an integer multiple of the carrier period.

The HFin signal 350 is provided to a first mixer input terminal of a mixer 354. The HFin signal 350 is also provided to an input terminal of a carrier extraction block 352. As is known in the art, the carrier extraction block 352 may simply be a phase locked loop (PLL). An output terminal of the carrier extraction block 352 provides a carrier frequency signal 336 to an input terminal of the Xor gate 314. In this example, the carrier extraction block 352 also provides an in-phase and quadrature representation of the carrier frequency signal 336 to a second mixer input terminal of the mixer 354. It will be appreciated that in other examples a one-dimensional, or any other type of signal, may be provided to the second mixer input terminal. The mixer 354 provides a coherent baseband signal 304 at a mixer output terminal, which is connected to the ADC input terminal.

In this example, the digital receiver 326 has a second feedback terminal 356, which provides a second feedback signal 366. As will be discussed in more detail below, the second feedback signal is used to control which of a plurality of carrier clock pulses that occur during a symbol duration is used to clock the ADC 306. More generally, a timing selector 358 is configured to provide an adjusted configurable clock signal 368 such that it has a transition that corresponds to one of a plurality of transitions in the carrier frequency signal during a single symbol in the received baseband signal, wherein the selected one of the plurality of transitions is selected in accordance with the second feedback signal 366.

In the same way as for FIG. 1, the digital receiver 326 also produces a first feedback signal 324 that is used to control whether it is the rising or falling edge of an original carrier clock pulse that is used to clock the ADC 306. It will be appreciated that using the first feedback signal 324 doubles the number of sampling opportunities within a single symbol, when compared with a circuit that only uses the second feedback signal 366. That is, the addition of the first feedback signal 324 and the Xor gate 314 can double the sampling accuracy to half a carrier period.

The signal processing circuit of FIG. 3 also includes a timing selector block/component 358. The timing selector 358 has a timing selector input terminal 360 that is connected to the Xor output terminal of the Xor gate 314, and receives the configurable clock signal 322. The timing selector 358 also has a timing selector output terminal 362 that provides an adjusted configurable clock signal 368 to the ADC clock terminal of the ADC 306. The timing selector 358 further has a timing selector control terminal 364 that is connected to the digital receiver second feedback terminal 356, and receives the second feedback signal 366. The timing selector 358 may be implemented as a programmable frequency divider.

The timing selector 358 in this example performs two main functions. Firstly, it performs a frequency division operation, in this example an integer frequency division operation, on the received configurable clock signal 322, such that the frequency of the adjusted configurable clock signal 368 matches the frequency of symbols in the coherent baseband signal 304. The timing selector 364 may be hardcoded with a frequency division factor that corresponds to the expected modulation frequency. Alternatively, the timing selector 364 may be capable of receiving or retrieving the required frequency division factor from memory.

Secondly, the timing selector 358 can select which of the signal transitions (that is, which rising edge or which falling edge) in the configurable clock signal 322 is included in the adjusted configurable clock signal 368 in order to clock the ADC 306. This timing selection may be referred to as phase shifting because it relates to setting the phase of the adjusted configurable clock signal 368 after frequency division.

In one example, the digital receiver 326 sets the first feedback signal 324 and the second feedback signal 366 such that, for different symbols, the rising edge of the adjusted configurable clock signal 368 occurs at a different point in time within the symbol. For example, with reference to FIG. 2, the first feedback signal 324 and the second feedback signal 366 may be sequentially set such that:
the first sampling opportunity shown with a square is used for a first received symbol;
the first sampling opportunity shown with a circle is used for a second received symbol;
the second sampling opportunity shown with a square is used for a third received symbol;
etc.

This sequential processing can be achieved by setting:
i. the first feedback signal 324 such that represents an instruction for the Xor gate to perform an inversion, and the second feedback signal 366 such that it represents a command sequence [0 . . . Nc−1] for Nc symbols, where Nc=carrier frequency/symbol frequency); followed by
ii. the first feedback signal 324 such that it represents an instruction for the Xor gate not to perform an inversion, and the second feedback signal 366 such that it represents the same command sequence [0 . . . Nc−1] for Nc symbols.

The digital receiver 326 can then apply a decision algorithm that will interleave the two sets into one and proceed by calculating the optimum sampling phase TO with a half-integer offset accuracy using received ADC output signals 334 for the different values of the command sequences. In this way, the digital receiver 326 sequentially sets the second feedback signal at a plurality of control values, and subsequently set the second feedback signal in accordance with received ADC output signals for the plurality of control values.

Such a scan of the possible sample phases can be performed during a known preamble portion of the received HFin signal 350. The digital receiver 326 can then process the ADC output signals 334 received from the ADC 306 for the different symbols in order to identify the best symbol timing. One example for identifying the best symbol timing/phase can involve identifying preamble zero crossings (Tzc), as described in EP 2 515 467 A1, the entire contents of which are incorporated herein by reference. It will be appreciated that different ways of determining the best sample timing using received ADC output signals 334 for different sampling timings/phases can also be used. For example, the digital receiver 326 may determine, for each of a plurality of control values, a conversion metric representative of the quality of the analogue-to-digital conversion. Then, in accordance with the determined conversion metrics, the digital receiver 326 can subsequently set the second control signal as one of the plurality of control values. It will be appreciated that any suitable conversion metric can be used.

One or more of the components shown in FIG. 3, and optionally all of the components shown in FIG. 3, may be provided on an integrated circuit, which may be considered as a smart card chip or an NFC chip.

FIG. 4 shows an example implementation of a digital receiver 426 that can provide a first feedback signal 424 for use with the circuits shown in FIGS. 1 and 3. The digital receiver 426 may represent an RFID receiver for either phase shift keying (PSK) or amplitude shift keying (ASK) modulation. The digital receiver 426 can be considered as a high level solution to setting the first feedback signal 424, may not require processing of a preamble, and may not require an algorithm to sequentially step through the potential sampling phases/instants in turn.

FIG. 4 shows an ADC 406. The ADC 406 has an ADC output terminal that is connected to a digital receiver input terminal 428. In this example, the digital receiver input terminal 428 is connected to an input terminal of an optional pre-processing block 470. The pre-processing block 470 can perform gain control, DC removal, and/or equalization if a very high symbol rate is used when compared with channel bandwidth, for example. An output terminal of the pre-processing block 470 is connected to an input terminal of a detector block 472; or the digital receiver input terminal 428 is connected to the input terminal of the detector block 472 if a pre-processing block 470 is not used. The detector block 472, which can also be referred to as a slicer, can determine a symbol associated with the detector input signal received at the input terminal of the detector block 472. In this way, the detector block 472 can make a decision guess on the transmitted symbol. An output terminal of the detector block 472 provides a detector output signal that is one entry of the symbol alphabet, whereas the input signal to the detector block 472 is affected by ISI and noise.

Figure 5:
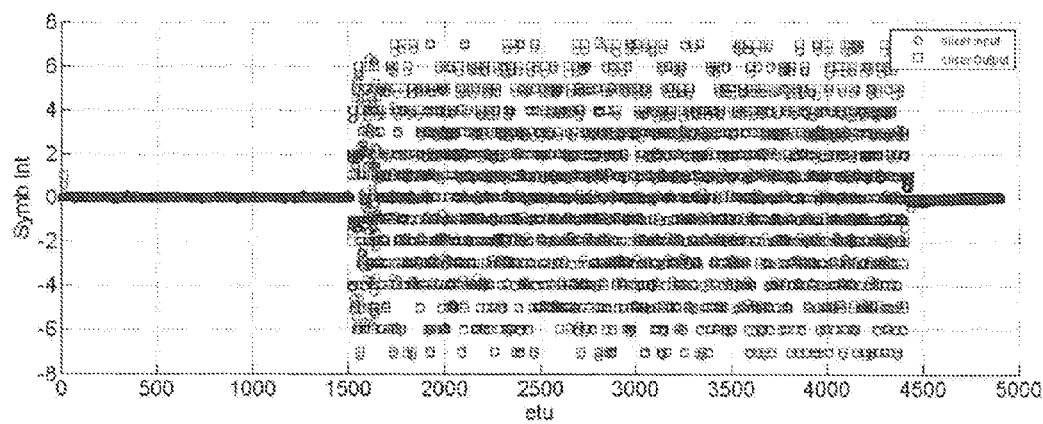
FIG. 5 shows examples of an input signal received at a detector block an output signal provided by the detector block.

FIG. 5 shows examples of an input signal received at the input terminal of the detector block 472 with circles, and an output signal provided at the output terminal of the detector block 472 with squares. The signals shown in FIG. 5 are for an 8-DPSK receiver. Both input and output signal are represented on the vertical axis in integer units, also known as "symbol intervals". The horizontal axis represents elementary time units. It can be seen that the output signal is always exactly one of the integer values on the vertical axis, whereas the input signal can take values in between the integer values due to ISI, noise, etc. In this example, the digital receiver operates merely a rounding to provide integer symbol levels.

Returning to FIG. 4, the digital receiver 426 also includes an error calculation block 474. The error calculation block 474 includes a first error calculation input terminal 476 and a second error calculation input terminal 478. The first error calculation input terminal 476 is connected to the detector input terminal such that it receives the detector input signal, which is a signal representative of the ADC output signal; for example the ADC output signal may have been pre-processed before it is provided to the first error calculation input terminal 476. The second error calculation input terminal 478 is connected to the detector output terminal such that it receives the detector output signal, which is a signal representative of the digital output signal; for example the second error calculation input terminal 478 may receive the digital output signal before or after a map-to-bin operation has been performed.

The error calculation block 474 also has an error calculation output terminal 480 that provides an error signal. In this example, the error signal is the difference between the signal received at the first error calculation input terminal 476 and the signal received at the second error calculation input terminal 478:

DetectionError=DetectorIn−DetectorOut

The error signal is therefore bounded by [−0.5 . . . 0.5].

The error signal is provided to a decision block 482, which in this example applies an algorithm to the information represented by the error signal in order to determine how to set the first feedback signal 424. Further details of an example algorithm are provided below.

In this example, an optional "map to bin" block 484 is connected to the detector block 472, and can process the multi-level detector output signal in order to provide a digital output signal 402.

FIG. 6 shows an example error signal that can be achieved for a 20 Mbps 8-DPSK RFID receiver, that utilises a first feedback signal such as the ones described above. The error signal shown in FIG. 6 contains one modulated data frame, and comprises:
  a first part 690, which corresponds to an unmodulated carrier (where error is small)
  a second part 692, which corresponds to a start-of-frame with a preamble (where error is large until any pre-processing has settled);
  a third part 694, which corresponds to the payload (where error is determined by both noise and uncompensated ISI);
  a fourth part 696, which corresponds to an end of frame marker; and
  a fifth part 698, which again corresponds to an unmodulated carrier.

It can be seen from FIG. 6 that the value of the error signal in the payload 694 rarely exceeds a value of about 0.1 or 0.2, which is indicative of accurate performance.

For comparison purposes, FIG. 7 shows an example error signal for a 20 Mbps 8-DPSK RFID receiver that does not utilise a first feedback signal. It can be seen that the error signal in the payload 794 of FIG. 7 is much larger than the error signal in the payload of FIG. 6. One can see that during the payload 794 the error can be low or high depending on the chosen sampling time with half carrier period difference between each other. This occurs because a wrong sample timing shows as additional ISI, which is not cured by the pre-processing.

One simple way of deriving an error margin from the error signal is by applying the following formulae to the received error signal (DetError):

$$\text{errMarginMax}=0.5-\max(\text{DetError,during payload})>=0$$

$$\text{errMarginMin}=0.5+\min(\text{DetError,during payload})>=0$$

$$\text{errMargin}=\min(\text{errMarginMax},\text{errMarginMin})$$

The error margin according to this definition is defined positive. For the error signal of FIG. 6 it is 0.10 symbol intervals (resulting in 0 bit errors), and for the error signal of FIG. 7 it is 0.00 symbol intervals (resulting in many bit errors, more than 50). Another possible approach to determine an error margin is to calculate the mean absolute value of the error, and map this on to an average error margin.

Determining each of errMarginMax, errMarginMin and errMargin in the way described above can be considered as examples of comparing a representation of the error signal with a threshold. That is, determining errMarginMax can be considered as comparing a first representation of the error signal with a first threshold, and determining errMarginMin can be considered as comparing a second representation of the error signal with a second threshold. Such a first representation of the error signal is a maximum value of the error signal and such a second representation of the error signal is a minimum value of the error signal. The first threshold may be different to, or the same as, the second threshold. As will be described below, one or more of errMarginMax, errMarginMin and errMargin can then be used to set the first feedback signal.

In some examples, the errMarginMax and errMarginMin values can be determined with respect to different threshold values. This can be achieved by using a value other than 0.5 in one of the calculations, or by comparing the result of one of the calculations with a value other than 0. That is, different numerical constant values can be used to determine a first representation of the error signal (errMarginMax) and a second representation of the error signal (errMarginMax). This can be advantageous if the signal path is considered to be non-linear.

Returning to FIG. 4, the decision block 482 can apply a decision algorithm that first checks if a consolidated value for the error margin (errMargin) is larger than a threshold, which may be predefined fraction of a symbol interval (for example, 0.05). If not, then the decision block 482 toggles the value of the first feedback signal 424 (for example, changes it from 0 to 1). Then for a next frame, the decision block 482 measures the error margin again. If the error margin improved for the next frame, then the decision block 482 can freeze/maintain the value of the first feedback signal 424, optionally until the end of a current transaction. (As is known in the art, a transaction can comprise a complete transmission between the reader and the card, including a number of frames. The end of the transaction can be said to occur when all information that needs to be exchanged is in fact exchanged; that is, all frames have been correctly received.) If the error margin is not improved, then the decision block 482 can return the value of the first feedback signal 424 to its previous value. In this way, the decision block 482 can set the first feedback signal in accordance with (i) a result of the comparison of the representation of the error signal with the threshold, and (ii) a result of a comparison of a representation of an earlier error signal with a threshold (which may or not be the same threshold).

In another example, each of two representations of the error signal (errMarginMax and errMarginMin) may be separately and independently compared with threshold levels (which may be the same as each other or different). This may be instead of comparing a consolidated value for the error margin (errMargin) with a threshold, as indicated above.

The decision block 482 may then toggle the value of the first feedback signal 424 if either, or both, of the two representations of the error signal (errMarginMax and errMarginMin) is larger than a threshold.

Examples disclosed herein relate to a method of sampling a coherent demodulated signal with half carrier accuracy symbol timing, with an ADC that can operate at a rate smaller or equal to the carrier rate. Such half a carrier period accuracy can make it possible for a smart card to be operated on both sides in a communication reader with equal performance. An analogue unit may be used, which comprises a carrier recovery unit, a demodulator to baseband, an ADC running at most at the carrier rate, and a mechanism to select the sampling grid with half carrier period accuracy. Such mechanism can be controlled by a digital unit, which can observe the ADC outputs and select the best sampling time.

Circuits disclosed herein can:
improve receiver sensitivity, which can result in an increased communication distance;
enable a very high data rate to work equally well on both sides of a smart card—flipping of the card can be effectively undone. The effect of the first feedback (clock invert) signal is to make the frame error rate performance on both sides of the smart card to be the better of the two, irrespective of the card orientation; and
be used to detect that a smart RFID card has been flipped by checking the output of the first feedback signal.

One or more examples disclosed herein can address difficulties associated with symbol clock recovery in receiver design. In some examples, circuits disclosed herein can find the right symbol timing by controlling the phase of a frequency divider, scanning over a finite set of possible symbol phases.

Circuits disclosed herein can be used in non-suppressed carrier systems where true coherent demodulation can take place and where the symbol frequency is in a fixed and known relation to the carrier frequency. Such circuits can be especially appropriate in future very high bit rate ISO14443-type systems (for example mobile NFC applications, or smartcard applications) that require a low-power proximity integrated circuit card (PICC). One such system may achieve 20 Mbps PCD to PICC data rate.

It will be appreciated that any components that are described herein as being coupled or connected could be directly or indirectly coupled or connected. That is, one or more components could be located between two components that are said to be coupled or connected whilst still enabling the required functionality to be achieved.

The invention claimed is:

1. A symbol clock recovery circuit comprising:
an Analogue to Digital Converter (ADC) comprising an ADC input terminal, an ADC output terminal and an ADC clock terminal, wherein the ADC input terminal is configured to receive a baseband signal, wherein the baseband signal is representative of one or more symbols, and wherein the ADC output terminal is configured to provide an ADC output signal;
a controllable inverter comprising an inverter input terminal, an inverter output terminal and an inverter control terminal, wherein the inverter input terminal is configured to receive a carrier frequency signal, the inverter output terminal is configured to provide a configurable clock signal to the ADC clock terminal; and wherein the configurable clock signal is selectively inverted with respect to the received carrier frequency signal in accordance with a first feedback signal received at the inverter control signal;
a timing detector comprising a timing detector input terminal, a timing detector output terminal, a first timing detector feedback terminal, wherein:
the timing detector input terminal is configured to receive the ADC output signal from the ADC output terminal;
the timing detector output terminal is configured to provide a digital output signal; and
the first timing detector feedback terminal is configured to provide the first feedback signal to the inverter control terminal;
wherein the timing detector is configured to determine an error signal associated with the received ADC output signal, and set the first feedback signal in accordance with the error signal;
wherein the controllable inverter is configured to set a timing of a rising edge of the configurable clock signal at a resolution of half carrier frequency.

2. The symbol clock recovery circuit of claim 1, wherein the timing detector is configured to compare a representation of the error signal with a threshold, and set the first feedback signal in accordance with a result of the comparison of the representation of the error signal with the threshold.

3. The symbol clock recovery circuit of claim 1, wherein the ADC is configured to perform an analogue to digital conversion upon receipt of either a rising edge or a falling edge in the configurable clock signal received at the ADC clock terminal.

4. The symbol clock recovery circuit of claim 1, wherein the timing detector is configured to determine the error signal associated with the received ADC output signal by comparing: (i) a signal representative of the ADC output signal with (ii) a signal representative of the digital output signal.

5. The symbol clock recovery circuit of claim 1, wherein the timing detector is configured to:
compare a first representation of the error signal with a first threshold,
compare a second representation of the error signal with a second threshold, and
set the first feedback signal in accordance with a result of either or both of (i) the comparison of the first representation of the error signal with the first threshold, and (ii)

the comparison of the second representation of the error signal with the second threshold.

6. The symbol clock recovery circuit of claim 5, wherein the timing detector is configured to:
   compare a consolidated value of the first representation of the error signal and the second representation of the error with a threshold, which is a predefined fraction of a symbol interval; and
   set the first feedback signal in accordance with a result of the comparison of the consolidated value with the threshold.

7. The symbol clock recovery circuit of claim 5, wherein the first representation of the error signal comprises a maximum value of the error signal and the second representation of the error signal comprises a minimum value of the error signal.

8. The symbol clock recovery circuit of claim 5, wherein the first threshold is different to the second threshold.

9. The symbol clock recovery circuit of claim 5 wherein the timing detector is configured to set the first feedback signal in accordance with (i) a result of the comparison of the representation of the error signal with the threshold, and (ii) a result of a comparison of a representation of an earlier error signal with a threshold.

10. The symbol clock recovery circuit of claim 1, wherein:
    the inverter output terminal is connected indirectly to the ADC clock terminal via a timing selector, the timing selector comprising a timing selector input terminal, a timing selector output terminal and a timing selector control terminal, wherein:
      the timing selector input terminal is configured to receive the configurable clock signal from the controllable inverter;
      the timing selector output terminal is configured to provide an adjusted configurable clock signal to the ADC clock terminal; and
      the timing selector control terminal is configured to receive a second feedback signal;
    the timing selector is configured to provide the adjusted configurable clock signal such that it has a transition that corresponds to one of a plurality of transitions in the carrier frequency signal during a single symbol in the received baseband signal, wherein the selected one of the plurality of transitions is selected in accordance with the second feedback signal; and
    the timing detector has a second feedback terminal that is configured to provide the second feedback signal, wherein the timing detector is configured to sequentially set the second feedback signal at a plurality of control values, and subsequently set the second feedback signal in accordance with received ADC output signals for the plurality of control values.

11. The symbol clock recovery circuit of claim 10, wherein the timing detector is configured to:
    determine, for each of the plurality of control values, a conversion metric representative of the quality of the conversion;
    in accordance with the determined conversion metrics, subsequently set the second control signal as one of the plurality of control values.

12. The symbol clock recovery circuit of claim 10, wherein the timing detector is configured to perform an integer frequency division operation on the received configurable clock signal, such that the frequency of the adjusted configurable clock signal matches the frequency of symbols in the coherent baseband signal.

13. A data communication system comprising the symbol clock recovery circuit of claim 1.

14. An integrated circuit comprising the symbol clock recovery circuit of claim 1.

15. A symbol clock recovery circuit comprising:
    an Analogue to Digital Converter (ADC) comprising an ADC input terminal, an ADC output terminal and an ADC clock terminal, wherein the ADC input terminal is configured to receive a baseband signal, wherein the baseband signal is representative of one or more symbols, and wherein the ADC output terminal is configured to provide an ADC output signal;
    a controllable inverter comprising an inverter input terminal, an inverter output terminal and an inverter control terminal, wherein the inverter input terminal is configured to receive a carrier frequency signal, the inverter output terminal is configured to provide a configurable clock signal to the ADC clock terminal; and wherein the configurable clock signal is selectively inverted with respect to the received carrier frequency signal in accordance with a first feedback signal received at the inverter control signal;
    a timing detector comprising a timing detector input terminal, a timing detector output terminal, a first timing detector feedback terminal, wherein:
      the timing detector input terminal is configured to receive the ADC output signal from the ADC output terminal;
      the timing detector output terminal is configured to provide a digital output signal; and
      the first timing detector feedback terminal is configured to provide the first feedback signal to the inverter control terminal;
    wherein the timing detector is configured to determine an error signal associated with the received ADC output signal, and set the first feedback signal in accordance with the error signal;
    wherein the timing detector is configured to:
    compare a first representation of the error signal with a first threshold,
    compare a second representation of the error signal with a second threshold, and
    set the first feedback signal in accordance with a result of either or both of (i) the comparison of the first representation of the error signal with the first threshold, and (ii) the comparison of the second representation of the error signal with the second threshold.

16. The symbol clock recovery circuit of claim 15, wherein the timing detector is configured to:
    compare a consolidated value of the first representation of the error signal and the second representation of the error with a threshold, which is a predefined fraction of a symbol interval; and
    set the first feedback signal in accordance with a result of the comparison of the consolidated value with the threshold.

17. The symbol clock recovery circuit of claim 15, wherein the first representation of the error signal comprises a maximum value of the error signal and the second representation of the error signal comprises a minimum value of the error signal.

18. The symbol clock recovery circuit of claim 15, wherein the first threshold is different to the second threshold.

19. The symbol clock recovery circuit of claim 15 wherein the timing detector is configured to set the first feedback signal in accordance with (i) a result of the comparison of the representation of the error signal with the threshold, and (ii) a result of a comparison of a representation of an earlier error signal with a threshold.

20. A symbol clock recovery circuit comprising:
   an Analogue to Digital Converter (ADC) comprising an ADC input terminal, an ADC output terminal and an ADC clock terminal, wherein the ADC input terminal is configured to receive a baseband signal, wherein the baseband signal is representative of one or more symbols, and wherein the ADC output terminal is configured to provide an ADC output signal;
   a controllable inverter comprising an inverter input terminal, an inverter output terminal and an inverter control terminal, wherein the inverter input terminal is configured to receive a carrier frequency signal, the inverter output terminal is configured to provide a configurable clock signal to the ADC clock terminal; and wherein the configurable clock signal is selectively inverted with respect to the received carrier frequency signal in accordance with a first feedback signal received at the inverter control signal;
   a timing detector comprising a timing detector input terminal, a timing detector output terminal, a first timing detector feedback terminal, wherein:
      the timing detector input terminal is configured to receive the ADC output signal from the ADC output terminal;
      the timing detector output terminal is configured to provide a digital output signal; and
      the first timing detector feedback terminal is configured to provide the first feedback signal to the inverter control terminal;
   wherein the timing detector is configured to determine an error signal associated with the received ADC output signal, and set the first feedback signal in accordance with the error signal;
   wherein:
   the inverter output terminal is connected indirectly to the ADC clock terminal via a timing selector, the timing selector comprising a timing selector input terminal, a timing selector output terminal and a timing selector control terminal, wherein:
      the timing selector input terminal is configured to receive the configurable clock signal from the controllable inverter;
      the timing selector output terminal is configured to provide an adjusted configurable clock signal to the ADC clock terminal; and
      the timing selector control terminal is configured to receive a second feedback signal;
   the timing selector is configured to provide the adjusted configurable clock signal such that it has a transition that corresponds to one of a plurality of transitions in the carrier frequency signal during a single symbol in the received baseband signal, wherein the selected one of the plurality of transitions is selected in accordance with the second feedback signal; and
   the timing detector has a second feedback terminal that is configured to provide the second feedback signal, wherein the timing detector is configured to sequentially set the second feedback signal at a plurality of control values, and subsequently set the second feedback signal in accordance with received ADC output signals for the plurality of control values.

* * * * *